United States Patent
Igarashi et al.

(10) Patent No.: US 7,972,078 B2
(45) Date of Patent: Jul. 5, 2011

(54) POWER TRANSMISSION MECHANISM OF SHAFT AND HUB

(75) Inventors: Masahiko Igarashi, Tochigi-ken (JP); Takeshi Mochizuki, Tochigi-ken (JP); Masanori Kosugi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 437 days.

(21) Appl. No.: 10/567,134

(22) PCT Filed: Aug. 3, 2004

(86) PCT No.: PCT/JP2004/011079
§ 371 (c)(1),
(2), (4) Date: Feb. 6, 2006

(87) PCT Pub. No.: WO2005/015040
PCT Pub. Date: Feb. 17, 2005

(65) Prior Publication Data
US 2008/0152424 A1   Jun. 26, 2008

(30) Foreign Application Priority Data

| Aug. 7, 2003 | (JP) | 2003-288906 |
| Aug. 7, 2003 | (JP) | 2003-288918 |
| Aug. 7, 2003 | (JP) | 2003-288924 |
| Jun. 15, 2004 | (JP) | 2004-176647 |
| Jun. 15, 2004 | (JP) | 2004-176656 |

(51) Int. Cl.
*F16D 1/06* (2006.01)

(52) U.S. Cl. .......... 403/359.6; 403/359.1; 464/179

(58) Field of Classification Search ............ 403/359.1, 403/359.5, 359.6; 464/179, 182
See application file for complete search history.

(56) References Cited

U.S. PATENT DOCUMENTS

| 4,115,022 A | * | 9/1978 | Orain ..................... 403/359.6 |
| 4,175,404 A | | 11/1979 | Schopf |
| 4,509,381 A | * | 4/1985 | Ikemoto et al. ............. 403/282 |
| 5,503,494 A | | 4/1996 | Kamata et al. |
| 5,536,101 A | | 7/1996 | Schwärzler et al. |

(Continued)

FOREIGN PATENT DOCUMENTS

DE   26 56 946 A1   6/1978

(Continued)

OTHER PUBLICATIONS

Machine Translation of Foreign patent JP-2001-343023.*

(Continued)

*Primary Examiner* — Victor MacArthur
(74) *Attorney, Agent, or Firm* — Arent Fox LLP

(57) ABSTRACT

A power transmission mechanism of a shaft and a hub, wherein a shaft tooth part comprises a ridge part formed of a crowning with varied tooth thickness, and a hub tooth part comprises a ridge part having tooth thickness formed in a specified linear shape and having an inner diameter varying from the end part thereof to a shaft shank side. A first step part swelling to the hub tooth part is formed in the bottom part of the shaft tooth part, and a second step part recessed in a direction opposite to the shaft tooth part is formed in the ridge part of the hub tooth part. The start point of the first step part and the start point of the second step part are set at positions offset by a specified distance from each other.

6 Claims, 14 Drawing Sheets

U.S. PATENT DOCUMENTS

| | | | |
|---|---|---|---|
| 5,580,183 A | 12/1996 | Brackoneski et al. | |
| 5,660,494 A | 8/1997 | Schwarzler et al. | |
| 5,779,551 A * | 7/1998 | Stall et al. | 403/359.6 |
| 6,142,033 A | 11/2000 | Beigang | |
| 6,685,572 B2 | 2/2004 | Makino et al. | |
| 7,052,402 B2 | 5/2006 | Ichikawa et al. | |
| 2006/0188328 A1 * | 8/2006 | Gutierrez et al. | 403/359.1 |

FOREIGN PATENT DOCUMENTS

| | | |
|---|---|---|
| DE | 91 16 324 U1 | 8/1992 |
| DE | 195 23 584 A1 | 1/1997 |
| EP | 1 016 801 A1 | 7/2000 |
| FR | 1581658 A | 9/1969 |
| FR | 2 562 969 A1 | 10/1985 |
| FR | 2 802 255 A | 6/2001 |
| GB | 855282 * | 11/1960 |
| GB | 1 224 419 A | 3/1971 |
| JP | 33-10508 B1 | 12/1958 |
| JP | 2-062461 A | 3/1990 |
| JP | 3-032436 A | 2/1991 |
| JP | 3-69844 A | 3/1991 |
| JP | 4-116017 U | 10/1992 |
| JP | 7-301304 A | 11/1995 |
| JP | 09-042303 | 2/1997 |
| JP | 9-512610 A | 12/1997 |
| JP | 11-514079 A | 11/1999 |
| JP | 2000-97244 A | 4/2000 |
| JP | 2001-287122 A | 10/2001 |
| JP | 2001-343023 A | 12/2001 |
| JP | 2005-069741 A | 3/2005 |
| SU | 398782 A * | 1/1974 |
| WO | 97/01714 A1 | 1/1997 |

OTHER PUBLICATIONS

Co-pending; co-related; U.S. Appl. No. 10/567,404, filed Feb. 6, 2006; By: Masahiko Igarashi et al.; Title: Power Transmission Mechanism of Shaft and Hub.

* cited by examiner

FIG. 6

| TILT ANGLE θ | 3° | 5° | 10° | 15° | 25° | 35° | 45° | 90° |
|---|---|---|---|---|---|---|---|---|
| STRESS RELAXATION | × | ○ | ◎ | ◎ | ◎ | ◎ | ○ | × |
| PRODUCTIVITY | × | ○ | ◎ | ◎ | ◎ | ◎ | ○ | × |

POWER TRANSMISSION MECHANISM OF SHAFT AND HUB

CROSS-REFERENCE TO RELATED APPLICATION

This application is a National Stage entry of International Application No. PCT/JP2004/011079, filed Aug. 3, 2004, the entire specification claims and drawings of which are incorporated herewith by reference.

TECHNICAL FIELD

The present invention relates to a power transmitting mechanism for transmitting torque smoothly between two members comprising a shaft and a hub.

BACKGROUND ART

On motor vehicles such as automobiles, there have been employed a set of constant velocity joints for transmitting drive power from an engine through a shaft to axles. Each constant velocity joint comprises an outer member, an inner member, and a torque transmitting member disposed between the outer and inner members for transmitting torque between the outer and inner members. The constant velocity joint includes a shaft/hub unit having a tooth assembly which comprises a shaft tooth section on the shaft and a hub tooth section on a hub, the shaft tooth section and the hub tooth section being held in mesh with each other.

In recent years, there have been demands for efforts to reduce circumferential backlash of constant velocity joints which is caused by the chattering of the power transmitting system. Heretofore, attempts have been made to reduce backlash between the inner ring and the shaft with a constant velocity joint having shaft serrations tilted at a torsional angle. Depending on the direction of the torsional angle and the direction of the torque load, the mechanical strength and service life of the inner ring and the shaft are likely to vary from product to product.

In the art of gears, technical concepts for crowning tooth surfaces have been disclosed in Japanese Laid-Open Patent Publication No. 2-62461, Japanese Laid-Open Patent Publication No. 3-69844, and Japanese Laid-Open Patent Publication No. 3-32436, for example.

Japanese Laid-Open Patent Publication No. 11-514079 reveals a shaft/hub unit having a tooth assembly for transmitting torque. The disclosed tooth assembly includes a shaft tooth section having a constant outside diameter in the longitudinal direction and a hub tooth section having a constant base diameter in the longitudinal direction. The shaft tooth section has a base diameter (dw1) and the hub tooth section has an inside diameter (Dn1) in a first region at a shaft end. The shaft tooth section also has a base diameter (dw2) and the hub tooth section has an inside diameter (Dn2) in a second region near a shaft shank. The base diameter (dw2) of the shaft tooth section and the inside diameter (Dn2) of the hub tooth section in the second region are set to respective values greater than the base diameter (dw1) of the shaft tooth section and the inside diameter (Dn1) of the hub tooth section in the first region (dw1<dw2, Dn1<Dn2).

Japanese Laid-Open Patent Publication No. 2000-97244 on a splined connection between a shaft member and an outer circumferential member discloses that the shaft member has, near a shaft shank thereof, a larger-diameter region where the diameter of the shaft member at the bottom lands between the teeth is increased, and the teeth of the shaft member and the teeth of the outer circumferential member mesh with each other in the larger-diameter region.

The applicant of the present application has proposed a spline shaft wherein the crowning top is positioned where the stress is minimized when torque is applied to a region where the spline shaft and a constant velocity joint mesh with each other, thereby preventing the stress from concentrating on certain regions and simplifying the overall structure of the spline shaft (see Japanese Laid-Open Patent Publication No. 2001-287122).

DISCLOSURE OF THE INVENTION

Problems to be Solved by the Invention

It is a general object of the present invention to provide a power transmitting mechanism for a shaft and a hub, which is designed to prevent stresses from concentrating on certain regions for increased static mechanical strength and fatigue strength.

Means for Solving the Problems

According to the present invention, when torque is applied to a portion between a shaft and a hub wherein a shaft tooth section and a hub tooth section are held in mesh with each other, by increasing the outside diameter of a valley of the shaft tooth section, which is a stress concentrating region, the stresses are distributed and strength of the shaft is increased.

Further, according to the present invention, since a changing point of the outside diameter of the valley of the shaft tooth section and a changing point of the inside diameter of a peak of the hub tooth section are offset from each other by a predetermined distance, the stresses imposed on the shaft tooth section are distributed to one changing point and the other changing point, thereby relaxing stress concentration. As a result, the stress concentration is relaxed and distributed, thus increasing static mechanical strength and fatigue strength of the area where the shaft tooth section and the hub tooth section mesh with each other.

Furthermore, according to the present invention, it is preferable to establish different major load transmitting regions depending on the magnitude of the load applied to the area where the shaft tooth section and the hub tooth section mesh with each other. For example, if the loads are classified into a low load, a medium load, and a high load, the main load transmitting regions for transmitting the low load, the medium load, and the high load are established successively in a direction from a crowning top toward a shaft shank, thus relaxing the concentration of stresses on particular areas.

BRIEF DESCRIPTION OF THE DRAWINGS

FIG. 6 is a diagram showing the relationship between the tilt angle θ of the first step region of the shaft tooth section, stress relaxation, and productivity;

BEST MODE FOR CARRYING OUT THE INVENTION

Figure 1:
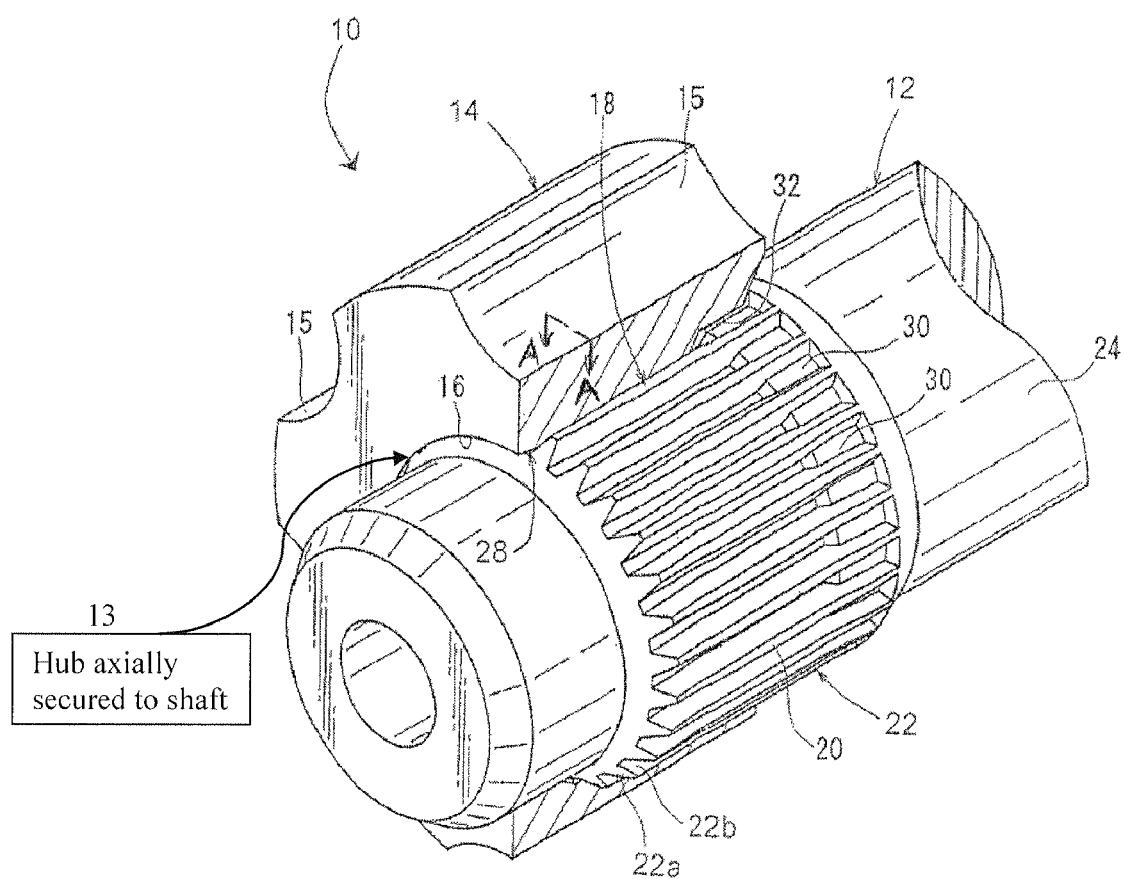
FIG. 1 is a perspective view, partly cut away, of a shaft/hub unit which incorporates a power transmitting mechanism according to a first embodiment of the present invention.

FIG. 1 shows a shaft/hub unit 10 which incorporates a power transmitting mechanism according to a first embodiment of the present invention. The shaft/hub unit 10 serves as part of a constant velocity joint. The shaft/hub unit 10 comprises a shaft 12 functioning as a power transmitting shaft and a hub 14 functioning as an inner ring that is disposed in openings in an outer cup (not shown) and has guide grooves 15 receiving therein balls (not shown).

Figure 4:
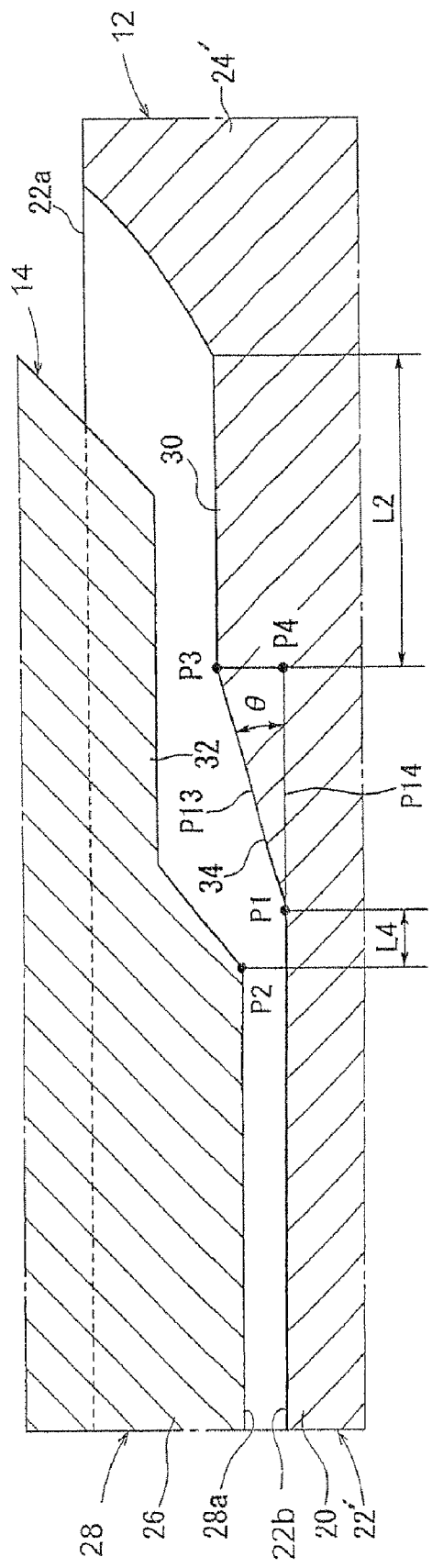
FIG. 4 is an enlarged partial longitudinal cross-sectional view showing a first step region slanted at a smaller tilt angle θ of the shaft shown in FIG. 3.
Figure 5:
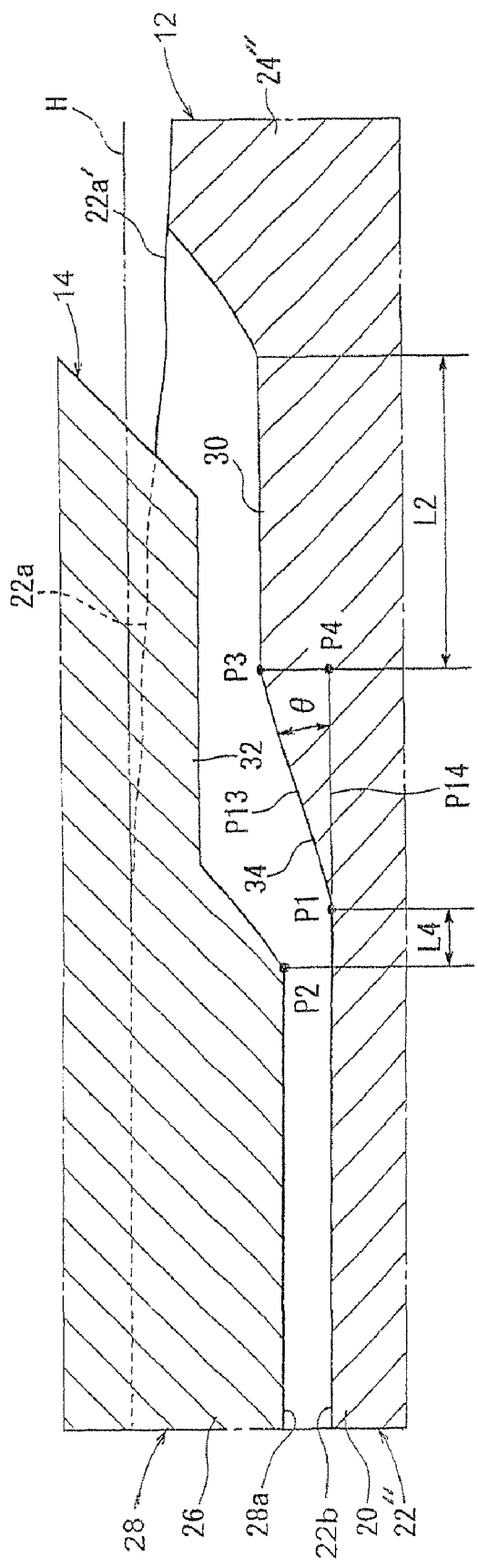
FIG. 5 is an enlarged partial longitudinal cross-sectional view showing a tooth of the shaft tooth section whose outside diameter varies toward a shaft shank of the shaft shown in FIG. 4.

The shaft 12 has fitting portions 18 on its respective opposite ends each fitting in an axial hole 16 in the hub 14. In FIG. 1, only one end of the shaft 12 is shown, with the other end omitted from illustration. The fitting portion 18 has a shaft tooth section 22 (various configurations of which are illustrated in FIGS. 4 and 5 with the corresponding reference numbers 22' and 22", respectively) comprising a plurality of straight spline teeth 20 which have a predetermined tooth length in the axial direction of the shaft 12 and which are formed successively in the circumferential direction of the shaft 12. Specifically, the shaft tooth section 22 comprises a circumferentially alternate succession of convex peaks 22a (the other embodiment of which is illustrated in the appropriate figures with the following corresponding reference number 22a') and concave valleys 22b.

The shaft 12 has a shaft shank 24 extending from an end of the shaft tooth section 22 which is closer to the center of the shaft 12. A retaining ring (not shown) is mounted in an annular groove (not shown) defined in the end of the shaft 12 for preventing the hub 14 from being released from the shaft 12, as illustrated by the labeled rectangular box 13 in FIG. 1.

Figure 2A:
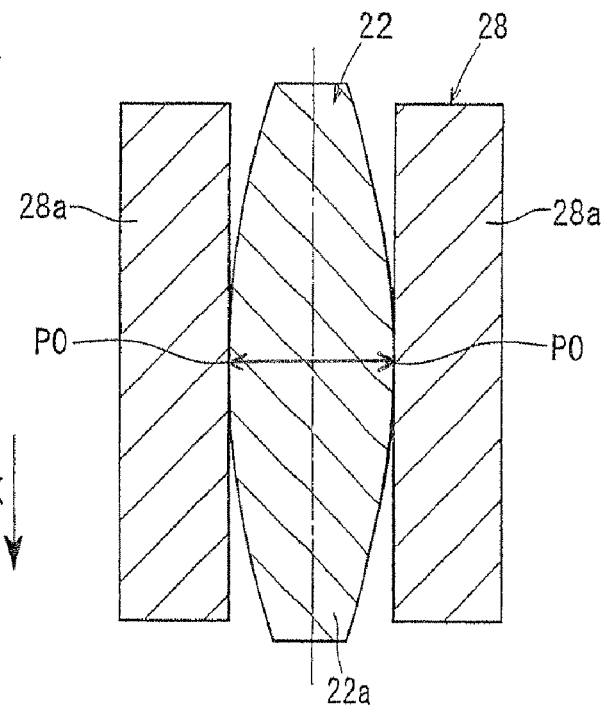
FIG. 2A is an enlarged partial transverse cross-sectional view taken along line A-A of FIG. 1 showing a shaft tooth section and a hub tooth section which are held in mesh with each other with no load applied thereto.

When the shaft 12 is viewed radially inwardly, as shown in FIG. 2A, each peak 22a of the shaft tooth section 22 is crowned such that the tooth thickness is maximum at a crowning top P0 and progressively decreases from the crowning top P0 toward the opposite ends of the peak 22a. Stated otherwise, the peak 22a as it is viewed in plan has a crowning shape whose opposite sides are equally curved as shown in FIG. 2A.

The hub 14 has, on the inner circumferential surface of the axial hole 16, a hub tooth section 28 having a plurality of straight spline teeth 26 that fit in the fitting portion 18 of the shaft 12. Specifically, the hub tooth section 28 comprises a circumferentially alternate succession of convex peaks 28a and concave valleys 28b (see FIGS. 12 through 14). As shown in FIG. 2A, the peaks 28a have substantially the same tooth thickness and extend substantially parallel to the axial direction of the shaft 12.

Figure 3:
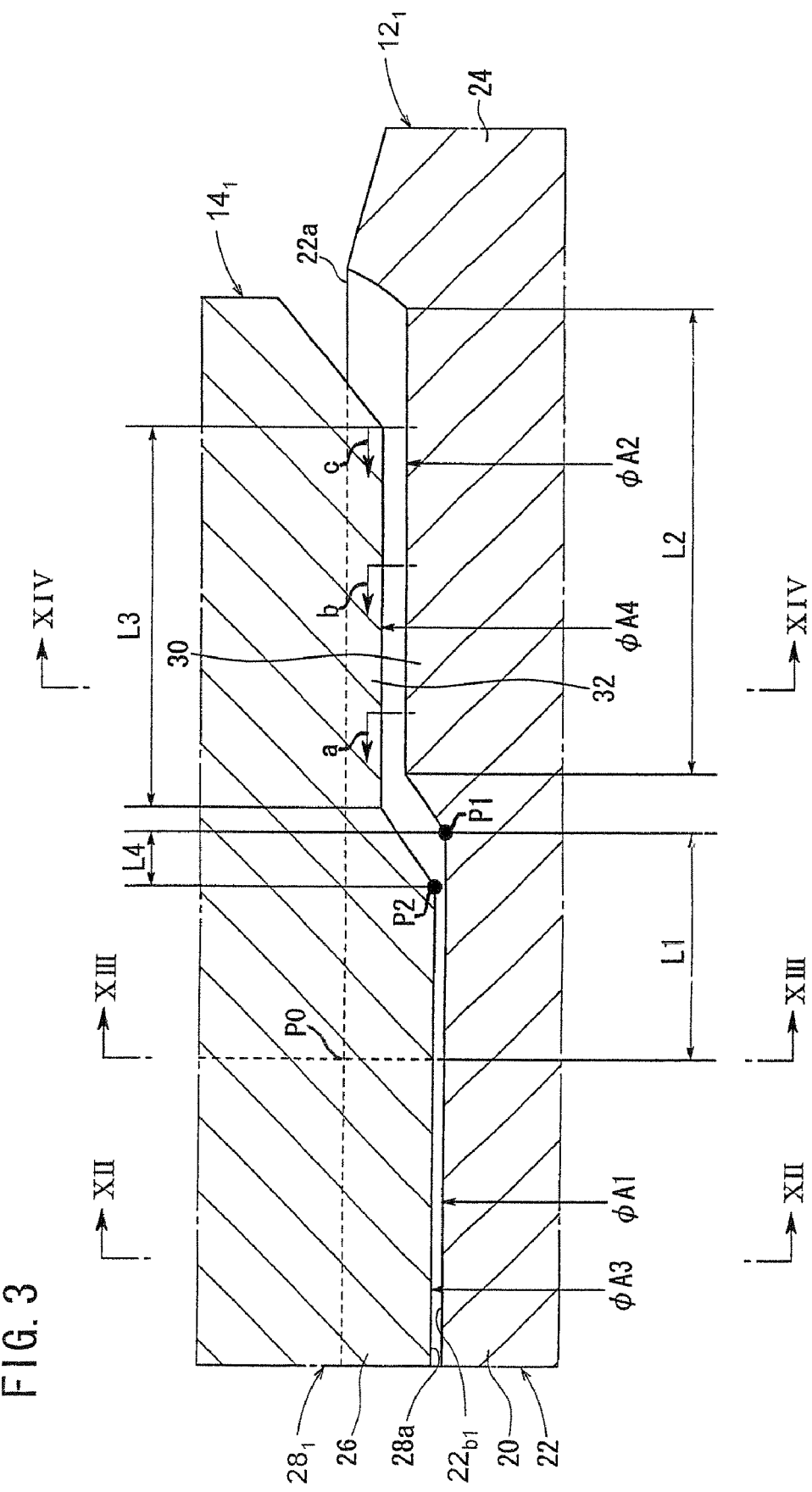
FIG. 3 is an enlarged partial longitudinal cross-sectional view in the axial direction of a shaft, showing a peak of the hub tooth section which engages in a valley of the shaft tooth section shown in FIG. 1.

FIG. 3 shows, in enlarged partial longitudinal cross section in the axial direction of the shaft 12, that a peak 28a of the hub tooth section 28 engages in a valley 22b of the shaft tooth section 22. In FIG. 3, a position corresponding to the crowning top is represented by P0.

A point P1 (changing point) is established on the bottom land of the valley 22b at a position which is displaced horizontally a predetermined distance L1 toward the shaft shank 24 from a position (see the broken-line) on the bottom land of the valley 22 (valley radius φA1) in alignment with the crowning top P0. From the point P1, the bottom land of the valley 22 is raised radially outwardly toward the hub tooth section 28, providing a first step region 30 having a valley radius φA2. The first step region 30 extends horizontally a predetermined distance L2 toward the shaft shank 24 and is joined to the shaft shank 24.

The first step region 30 of the shaft tooth section 22 may have a slanted surface or an arcuate curved surface or a compound surface having a predetermined radius of curvature. The peak 22a of the shank tooth section 22 has an outside diameter which may remain constant in the axial direction, as shown in FIGS. 3 and 4, or which may progressively decrease from an area close to the point P1 toward the shaft shank 24, as shown as 22a' in FIG. 5. With the outside diameter of the peak 22a' progressively decreasing toward the shaft shank 24, the shaft tooth section 22 can easily be manufactured by rolling racks and the function of the shaft tooth section 22 to transmit torque is not lowered. In FIG. 5, the reference character "H" represents a horizontal line to be compared with a change (reduction) in the outside diameter of the peak 22a'.

On the peak 28a of the hub tooth section 28, there is established a point P2 at a position which is offset a predetermined distance L4 from the point P1 in the shaft tooth section 22 in a horizontal direction away from the shaft shank 24. From the point P2, the peak 28a changes its peak radius φA3 to a peak radius φA4, providing a second step region 32 with the peal radius φA4. The second step region 32 extends horizontally a predetermined distance L3 toward the shaft shank 24.

The second step region 32 of the hub tooth section 28 may have a slanted surface or an arcuate curved surface or a compound surface having a predetermined radius of curvature, and may be of a shape different from the shape of the first step region 30. The tilt angle of the second step region 32 is set as desired complementarily to the tilt angle of the first step region 30. The shape of the hub tooth section 28 is not limited to the shape of the second step region 32, but may include a round shape, a tapered tape, or the like having a predetermined radius of curvature. The valleys 28b of the hub tooth section 28 have an inside diameter which remains constant in the axial direction.

The valley radii φA1, φA2 represent respective distances from the central axis of the shaft 12 to the bottom lands of the valley 22b of the shaft tooth section 22. The peak radii φA3, φA4 represent respective distances from the central axis of the shaft 12 to the top lands of the peak 28a of the hub tooth section 28.

The distance L2 in the shaft tooth section 22 may be set to a value greater than the distance L1 in the shaft tooth section 22 (L1<L2) in order to establish different major load transmitting regions for transmitting different loads including a low load, a medium load, and a high load, for example, depending on the magnitude of the load applied to the area where the shaft tooth section 22 and the hub tooth section 28 mesh with each other. The distance L2 in the shaft tooth section 22 and the distance L3 in the hub tooth section 22 may be set to substantially equal values (L2≈L3), and or the distance L3 in the hub tooth section 22 may be set to a value greater than the distance L2 in the shaft tooth section 22 (L2<L3), for allowing an offset (described later) to be easily established depending on dimensional tolerance and dimensional accuracy and also for improving the ease in assembling the shaft 12 and the hub 14 together.

As can be seen from FIG. 3, the point P1 as a starting point (changing point) where the first step region 30 of the shaft tooth section 22 starts to rise and the point P2 as a starting point (changing point) where the second step region 32 of the hub tooth section 28 starts to rise are offset substantially horizontally from each other by a predetermined distance L4.

Therefore, when torque is applied to the shaft/hub unit 10 wherein the shaft tooth section 22 and the hub tooth section 28 mesh with each other, since the point P1 in the shaft tooth section 22 and the point P2 in the hub tooth section 28 are offset from each other by the distance L4, the stresses imposed on the shaft/hub unit 10 are distributed to the points P1, P2, thereby relaxing stress concentration. As a result, the stresses are prevented from concentrating on, but are distributed to, the shaft tooth section 22 and the hub tooth section 28, thus increasing static mechanical strength and fatigue strength of the area where the shaft tooth section 22 and the hub tooth section 28 mesh with each other.

The points P1, P2 may be vertically aligned with each other without being offset from each other. With such an arrangement, the first step region 30 in the shaft tooth section 22 and the second step region 32 in the hub tooth section 28 coact with each other in distributing the stresses applied to the first step region 30 and relaxing stress concentration.

In FIG. 4, a right-angled triangle formed by interconnecting points P1, P3, P4 may have its cross-sectional area increased, and the angle θ formed between a line segment P14 interconnecting the points P1, P4 and a line segment P13 interconnecting the points P1, P3, i.e., the tilt angle θ of the first step region 30, may be set to a predetermined value for further relaxing stress concentration with a tapered surface 34 of the first step region 30.

The relationship between the tilt angle θ of the first step region 30, stress relaxation, and productivity is shown in FIG. 6. It can be seen from FIG. 6 that stress relaxation and productivity are good (see symbol "○") if the tilt angle θ is set to a value in the range from 5 degrees to 45 degrees, and optimum (see symbol "◉") if the tilt angle θ is set to a value in the range from 10 degrees to 35 degrees.

If the tilt angle θ is set to 3 degrees, no sufficient stress distribution capability is available, and it is difficult to manufacture the shaft tooth section 22 with rolling racks, to be described later. If the tilt angle θ is set to 90 degrees, excessive stresses concentrate on the first step region 30, and the durability of rolling racks used to manufacture the shaft tooth section 22 is reduced.

An ordinary shaft/hub spline fitting arrangement which is free of the first and second step regions 30, 32 has a stress peak point produced in the vicinity of the shaft shank. According to aspects of the present invention, however, the first step region 30 is provided in the shaft tooth section 22 to allow some stresses to concentrate on the point P1, thus distributing stresses that tend to concentrate on the shaft shank 24. If the tilt angle θ of the first step region 30 in the shaft tooth section 22 is set to too a large value, e.g., 90 degrees, for example, then excessive stresses concentrate on the point P1, failing to provide a stress distributing (stress relaxing) capability. By setting the tilt angle θ, i.e., the rise angle, of the first step region 30 to an appropriate value, the concentration of stresses in the vicinity of the shaft shank 24 is suitably distributed to reduce stresses at the peak point.

Figure 7:
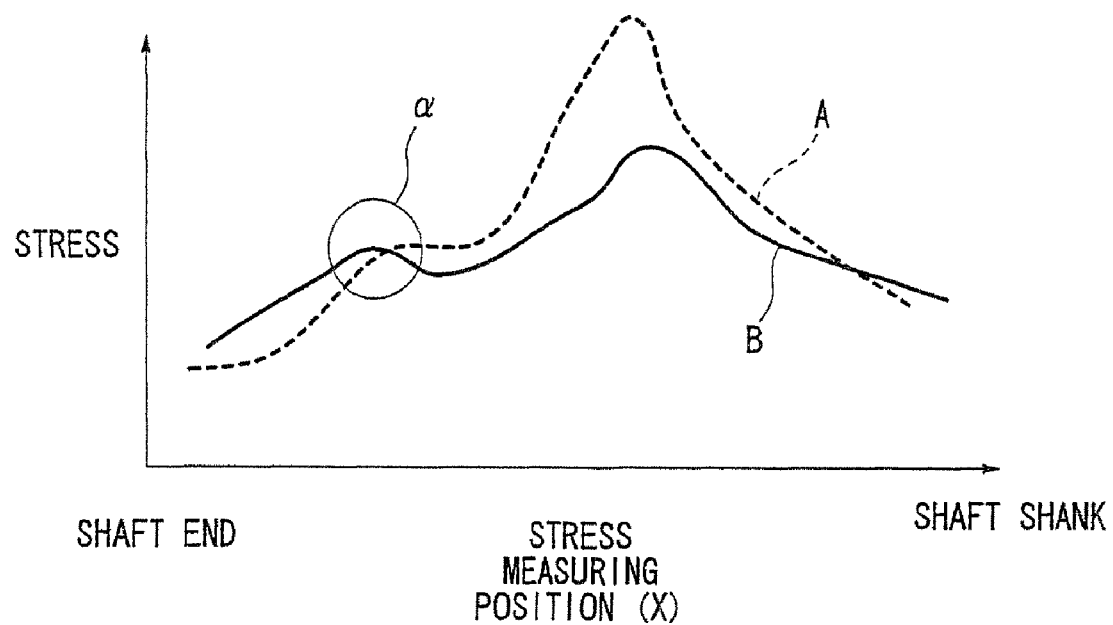
FIG. 7 is a graph showing the relationship between stresses developed on the shaft and positions where the stresses are measured, with respect to a shaft wherein a first step region and a second step region are not formed in a shaft tooth section and a hub tooth section and a shaft wherein a first step region and a second step region are formed in a shaft tooth section and a hub tooth section.

FIG. 7 shows a characteristic curve A (broken-line curve) of stresses on a comparative shaft wherein the first step region 30 and the second step region 32 are not formed in the shaft tooth section 22 and the hub tooth section 28 and a characteristic curve B (solid-line curve) of stresses on a shaft wherein the points P1, P2 are offset from each other by a predetermined distance and the tilt angle θ of the first step region 30 is set to a large value. A comparison between the characteristic curve A and the characteristic curve B indicates that according to the characteristic curve B which represents the structure having the tapered surface 34, the peak of stresses is reduced and the concentration of stresses is relaxed.

Figure 8:
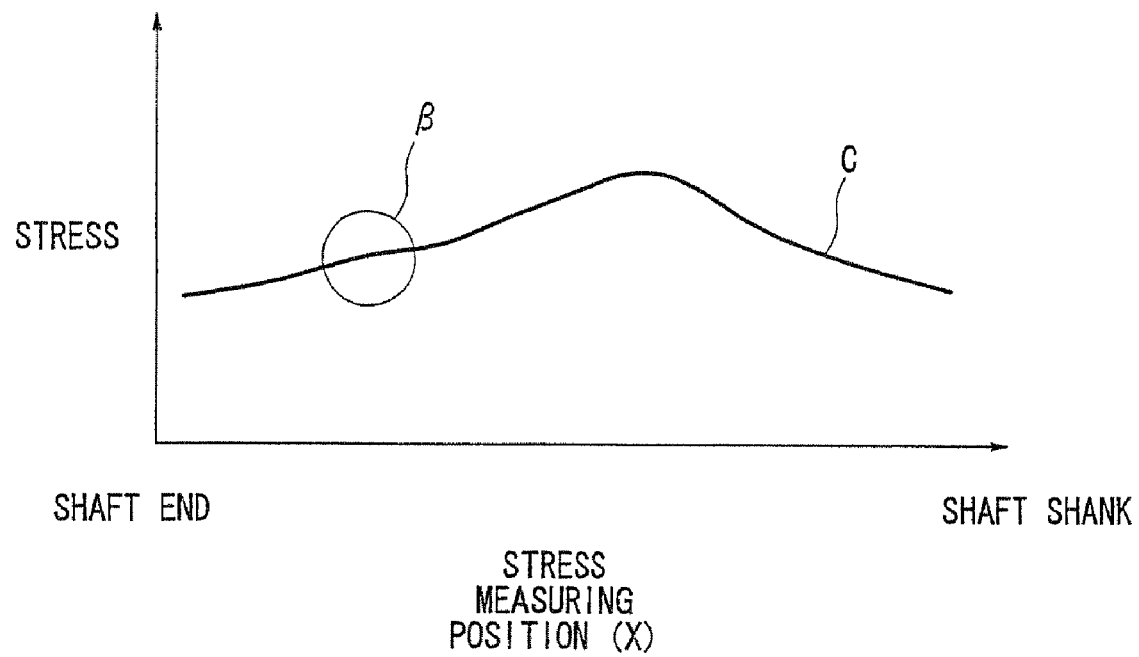
FIG. 8 is a graph showing the relationship between stresses developed on the shaft and positions where the stresses are measured with respect to a shaft wherein a first step region is slanted at a much smaller tilt angle θ.

FIG. 8 shows a characteristic curve C of stresses on a shaft wherein the tilt angle θ of the first step region 30 is smaller than with the characteristic curve B. It can be understood from FIG. 8 that by reducing the tilt angle θ to increase the size of the tapered surface 34, the tapered surface 34 is capable of more relaxing stresses (compare a portion a of the characteristic curve B shown in FIG. 7 and a portion 3 of the characteristic curve C shown in FIG. 8).

Figure 9:
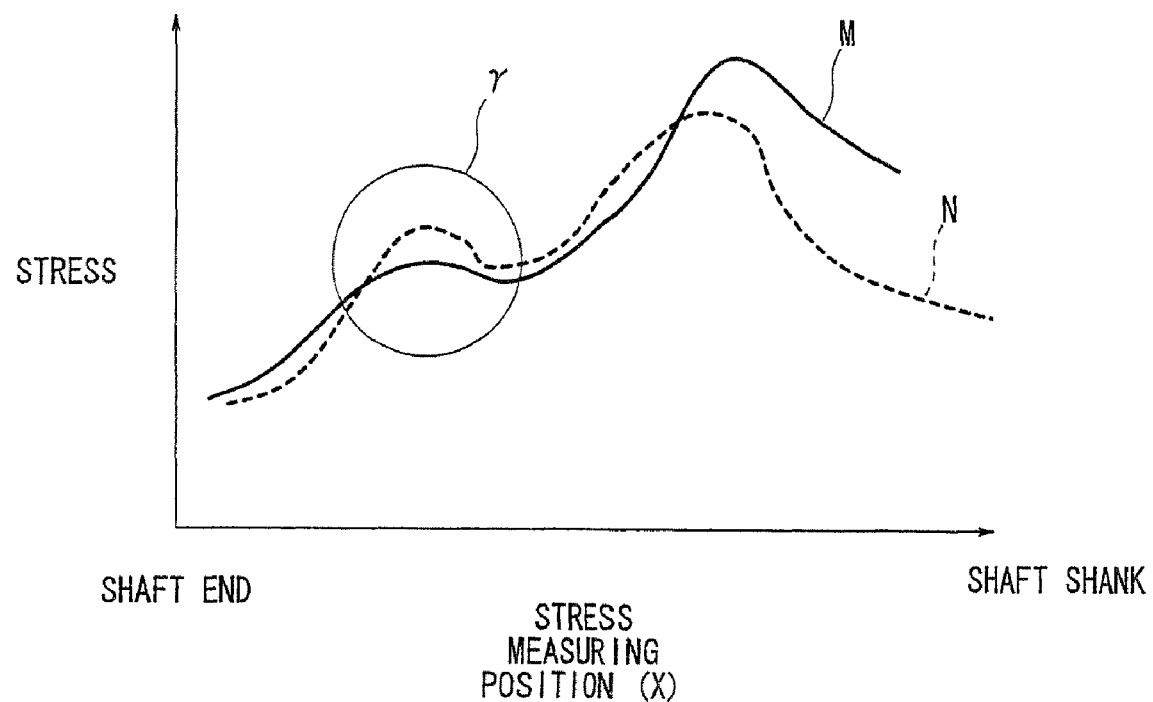
FIG. 9 is a graph showing the relationship between stresses developed on the shaft and positions where the stresses are measured, with respect to a shaft wherein a changing point of the diameter of a shaft tooth section and a changing point of the diameter of a hub tooth section are offset from each other and to a shaft wherein a changing point of the diameter of a shaft tooth section and a changing point of the diameter of a hub tooth section are not offset from each other.

FIG. 9 shows a characteristic curve M (solid-line curve) of stresses on a shaft wherein the point P1 in the shaft tooth section 22 and the point P2 in the hub tooth section 28 are offset from each other by a predetermined distance, and a characteristic curve N (broken-line curve) of stresses on a shaft wherein the points P1, P2 are not offset from each other, i.e., the distance by which the points P1, P2 are spaced horizontally from each other is nil.

A comparison of offset and offset-free portions (see portions γ of the characteristic curves M, N) shows that the characteristic curve M of the shaft wherein the starting point P1 in the shaft tooth section and the starting point P2 in the hub tooth section are offset from each other is more gradual than the characteristic curve N wherein the starting points P1, P2 are not offset from each other. The offset starting points P1, P2 are effective in relaxing stresses in the area where the radii change.

Figure 2B:
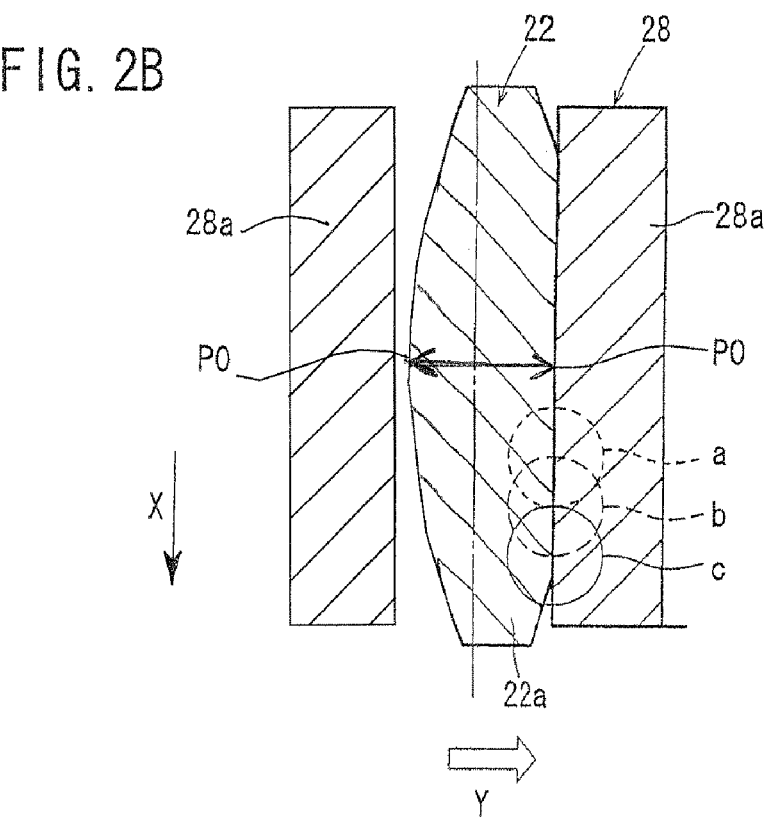
FIG. 2B is an enlarged partial transverse cross-sectional view taken along line A-A of FIG. 1 showing a shaft tooth section and a hub tooth section which are held in mesh with each other with torque applied thereto in the direction indicated by the arrow Y.

FIGS. 2A and 2B show the manner in which the crowned peak 22a of the shaft tooth section 22 and the peaks 28a of the hub tooth section 28, which are held in mesh with each other, are deformed when torque is applied to them in their unloaded state. It is assumed that when torque is applied to the peaks 22a, 28a, a load is applied to them in the direction indicated by the arrow Y which is perpendicular to the axis of the crowned peak 22a.

Figure 10:
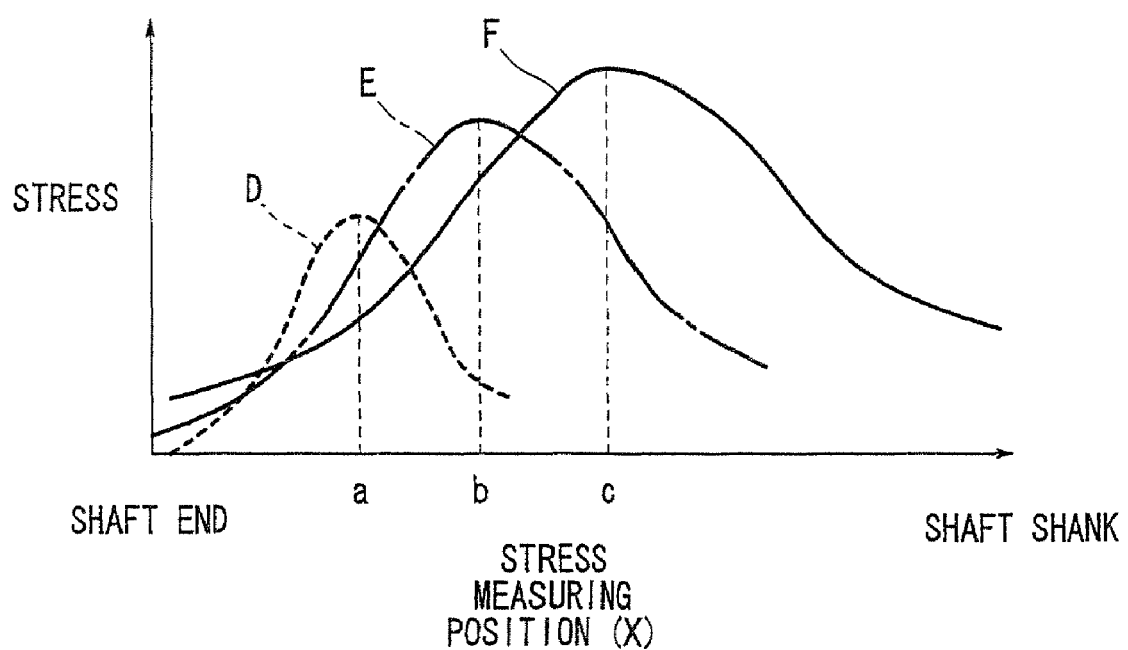
FIG. 10 is a graph showing the relationship between stresses developed on the shaft and positions where the stresses are measured when the stresses are produced in response to an input load imposed at the time torque is applied.

FIG. 10 shows the relationship between stresses developed on the shaft and positions where the stresses are measured (see the arrow X in FIGS. 2A and 2B). It can be seen from FIG. 10 that as the magnitude of an applied load varies, the peak point of stresses changes along the measured positions. If the magnitude of the applied load varies through three stages, i.e., a low load, a medium load, and a high load, then characteristic curves that are plotted under those loads include a low-load characteristic curve D, a medium-load characteristic curve E, and a high-load characteristic curve F, respectively.

Figure 11:
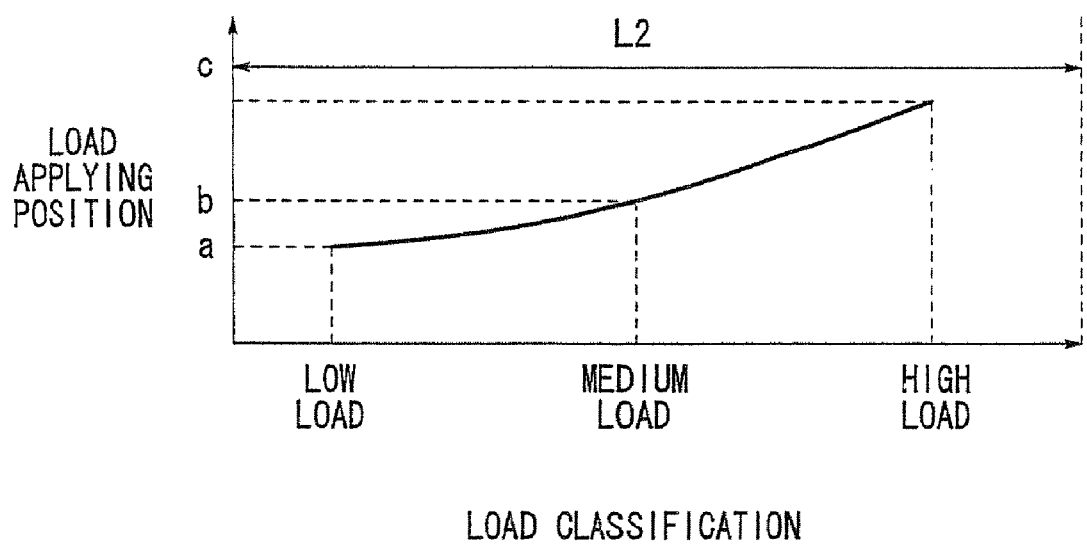
FIG. 11 is a graph showing the relationship between positions where loads are applied and the classification of the loads.

FIG. 11 shows the relationship between the classification of the applied loads, i.e., the low load, the medium load, and the high loads, and positions where the loads are applied. As can be understood from FIG. 2B, the shaft tooth section 22 and the hub tooth section 28 mesh with each other in successively changing areas, i.e., a circular area a, a circular area b, and a circular area c corresponding respectively to load-applied positions a, b, c, depending on the magnitude of the applied load. The areas in which the shaft tooth section 22 and the hub tooth section 28 mesh with each other are displaced away from the crowning top P0 toward the shaft shank 24 depending on the magnitude of the applied load.

Specifically, when the low load is applied, the circular area a serves as a major low-load transmitting area. When the medium load is applied, the circular area b which is displaced slightly from the circular area a toward the shaft shank 24 serves as a major medium-load transmitting area. When the high load is applied, the circular area c which is displaced slightly from the circular area b toward the shaft shank 24 serves as a major high-load transmitting area.

With the shaft tooth section 22 being thus crowned with the changing tooth thickness, the area where the load is transmitted (the peak point of stresses) changes depending on the magnitude of the applied load, thus relaxing the concentration of stresses on particular areas.

Figure 12:
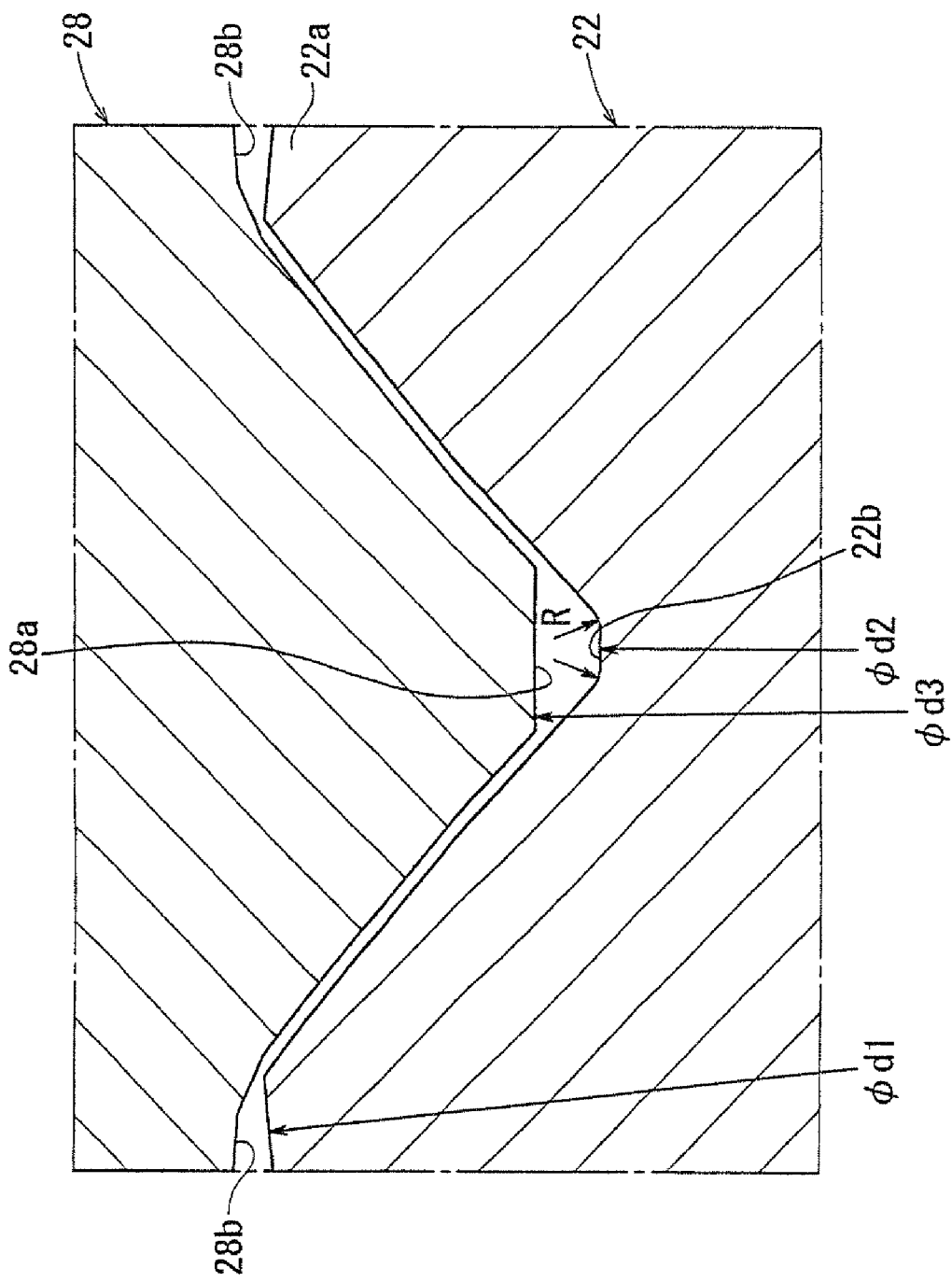
FIG. 12 is an enlarged partial longitudinal cross-sectional view taken along line XII-XII of FIG. 3.
Figure 13:
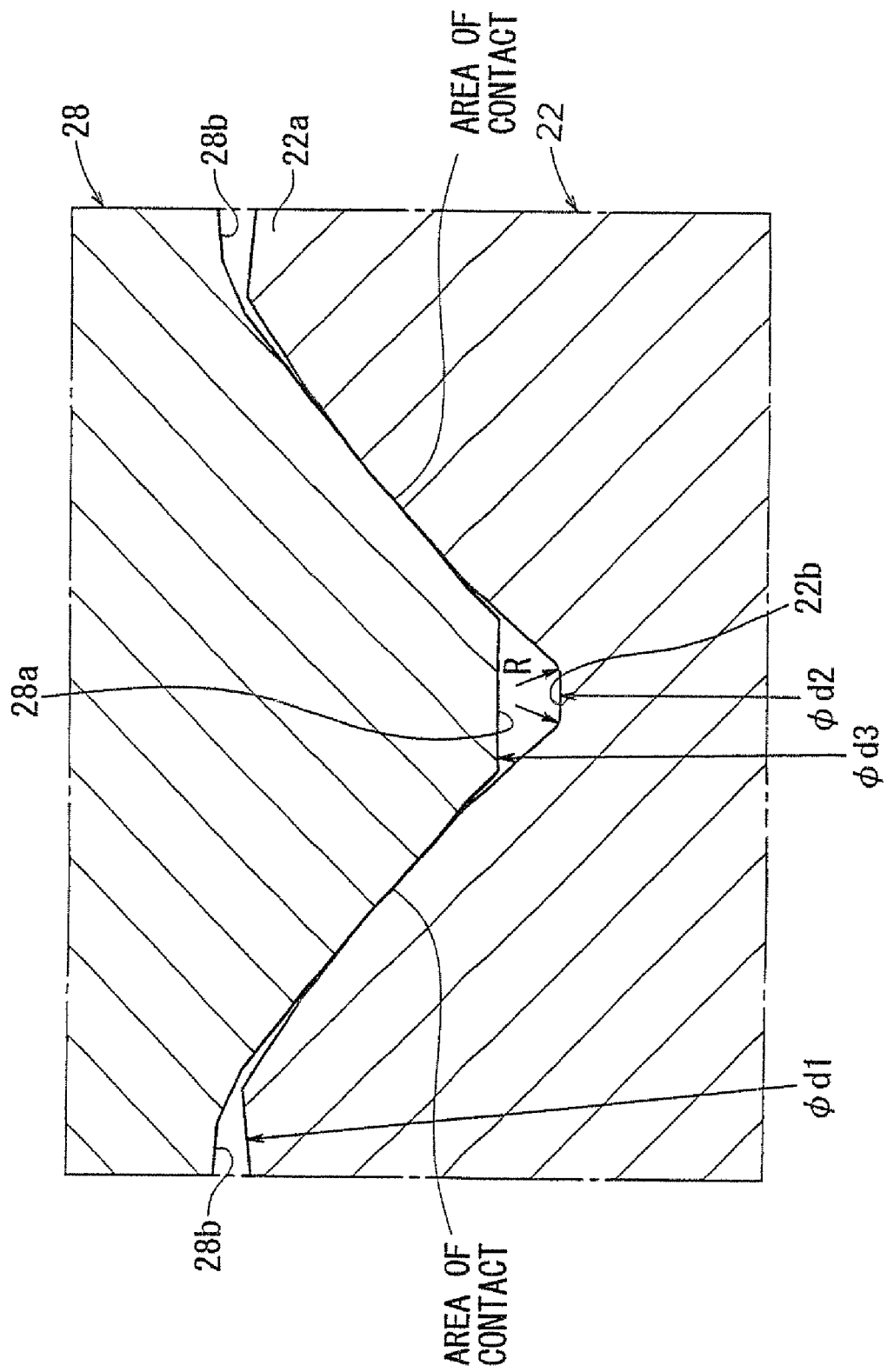
FIG. 13 is an enlarged partial longitudinal cross-sectional view taken along line XIII-XIII of FIG. 3.
Figure 14:
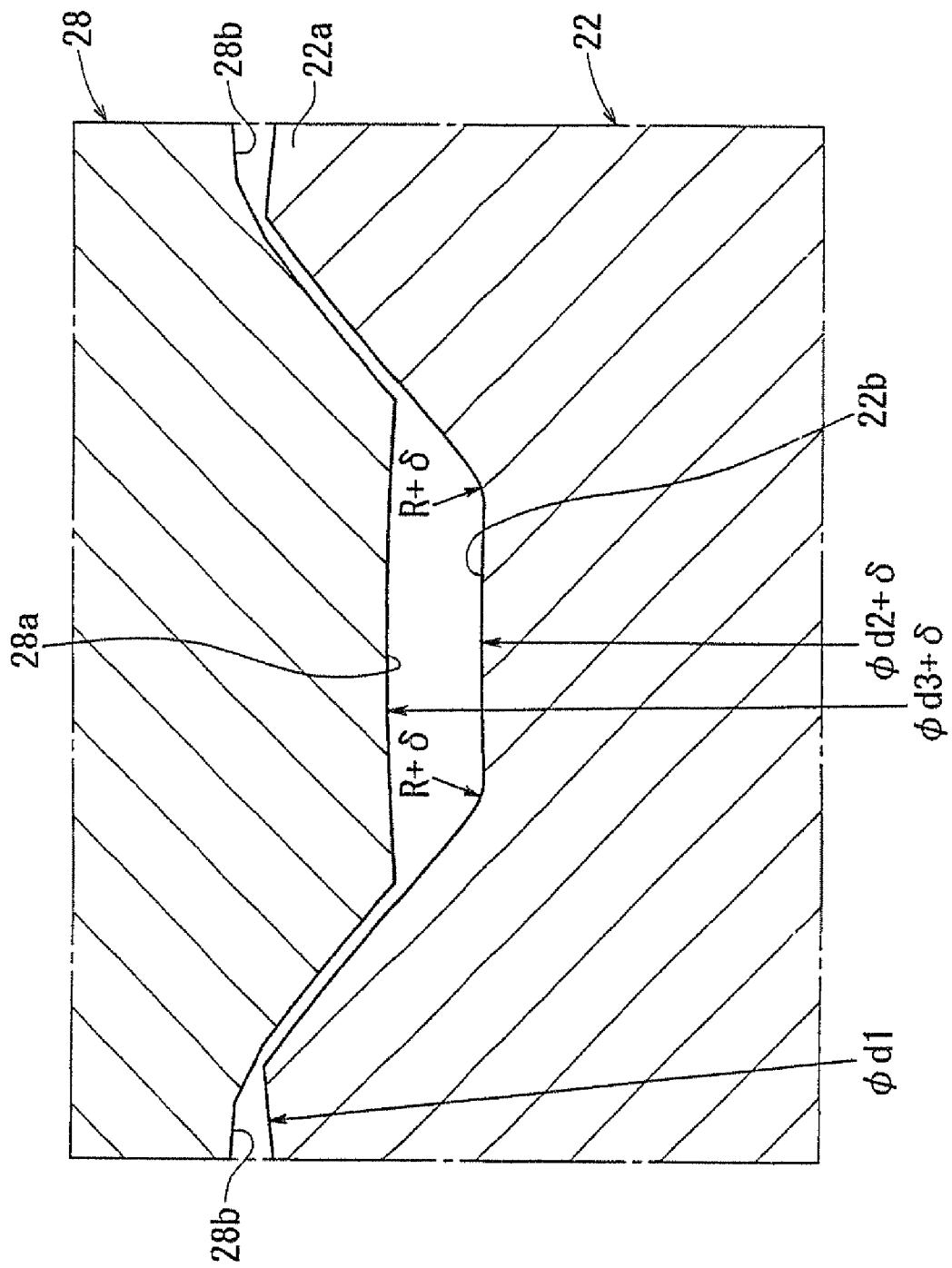
FIG. 14 is an enlarged partial longitudinal cross-sectional view taken along line XIV-XIV of FIG. 3.

FIGS. 12 through 14 are enlarged partial longitudinal cross-sectional views taken along line XII-XII, line XIII-XIII, and line XIV-XIV, respectively, of FIG. 3, showing the engagement of the peak 28a of the hub tooth section 28 in the valley 22b of the shaft tooth section 22b at the time the shaft 12 and the hub 14 are assembled together. In FIGS. 12 through 14, φd1 through φd3 represent pitch circle radii from the central axis of the shaft 12.

Since the shaft tooth section 22 is crowned, the peak 28a is held in contact with the surface of the valley 22b only in the vicinity of the crowning top P0 (see FIG. 13) and is held out of contact with the surface of the valley 22b in other areas (see FIGS. 12 and 14).

As the shaft tooth section 22 is of the crowned shape, the area of contact between the shaft tooth section 22 and the hub tooth section 28 is reduced, and the pressing load applied to assemble the shaft 12 and the hub 14 are assembled together is lowered to reduce stresses acting on the valley 22b of the shaft tooth section 22. Since the pressing load applied to assemble the shaft 12 and the hub 14 are assembled together is not increased, backlash between the shaft tooth section 22 and the hub tooth section 28 is suppressed.

As can be understood from a comparison between FIGS. 12 and 13 and FIG. 14, the radius of the shaft tooth section 22 in a stress concentrating region can be increased by δ by forming the first step region 30 and the second step region 32 in portions of the shaft tooth section 22 and the hub tooth section 28 which are close to the shaft shank 24.

Since the radius of the shaft tooth section 22 in the stress concentrating region is increased by 5, the radius of curvature of the bottom land R of the valley 22b of the shaft tooth section 22 can be increased for stress distribution. Overall stresses (main stresses) can be lowered by increasing the radius of the region close to the shaft shank 24 as compared with other regions.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

The invention claimed is:

1. A power transmission mechanism comprising:
   a shaft;
   a hub;
   a shaft tooth section formed on the shaft and comprising a plurality of shaft teeth;
   a hub tooth section formed on the hub and comprising a plurality of hub teeth; and
   a retaining ring, wherein the hub is axially secured relative to the shaft by the retaining ring in a position disposed around the shaft while holding the shaft tooth section and the hub tooth section in engagement with each other;
   wherein said shaft tooth section has a crowned peak having a varying tooth thickness along an axial length of the crowned peak and a shaft tooth valley;
   wherein said hub tooth section has a peak opposing and engaging said shaft tooth valley of said shaft tooth section, said peak of said hub tooth section having a constant tooth thickness along an axial length, and a hub tooth valley having a constant inside diameter in an axial direction of the shaft;
   wherein the shaft tooth valley includes first and second portions having different outside diameters and connected by a first step region sloping from a first starting point at an end of the first portion to an end of the second portion in a direction extending toward the hub tooth section;
   wherein said peak of said hub tooth section includes first and second peak portions having different inside diameters and connected by a second step region sloping from a second starting point at an end of the first peak portion to an end of the second peak portion in a direction extending away from said shaft tooth section;
   wherein the first starting point of the first step region and the second starting point of the second step region are offset from each other in the axial direction of the shaft by a predetermined distance; and
   wherein the end of the second portion and the end of the second peak portion are offset from each other in the axial direction of the shaft by a predetermined distance.

2. A mechanism according to claim 1, wherein said first step region of said shaft tooth section has a tilt angle set to a value ranging from 5 degrees to 45 degrees.

3. A mechanism according to claim 1, wherein the varying tooth thickness of the crowned peak of said shaft tooth section comprises a maximum tooth thickness at a crowning top and progressively decreases in the axial direction from the crowning top toward opposite ends of the crowned peak of said shaft tooth section.

4. A mechanism according to claim 3, wherein said shaft tooth section and said hub tooth section mesh with each other in an area proximate to the crowning top of the crowned peak, the area being displaced in a direction from the crowning top of the crowned peak of said shaft tooth section toward said shaft shank as a magnitude of an applied load increases on the crowned peak.

5. A mechanism according to claim 1, wherein said crowned peak of said shaft tooth section has an outside diameter which varies in the axial direction of said shaft.

6. A mechanism according to claim 5, wherein said crowned peak of said shaft tooth section has an outside diameter which gradually decreases toward said shaft shank.

* * * * *